United States Patent Office 2,875,157
Patented Feb. 24, 1959

2,875,157

RESOLVING WATER-IN-OIL EMULSIONS

Willard H. Kirkpatrick, Sugar Land, Tex., assignor to Visco Products Company, Houston, Tex., a corporation of Delaware No Drawing. Application March 16, 1956
Serial No. 571,882

10 Claims. (Cl. 252—344)

This invention relates in particular to the treatment of emulsions of mineral oil and water, such as petroleum emulsions commonly encountered in the production, handling and refining of crude mineral oil, for the purpose of separating the oil from the water. Also, the invention relates to the treatment of other water-in-oil types of emulsions wherein the emulsions are produced artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B. S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Still another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

One object of the invention is to provide a novel and economical process for resolving emulsions of the character referred to into their component parts of oil and water or brine.

Another object is to provide a novel reagent which is water-wettable, interfacial and surface-active in order to enable its use as a demulsifier or for such uses where surface-active characteristics are necessary or desirable. Other objects will appear hereinafter.

The treating agents employed in accordance with the present invention consist of compositions of high molecular weight which have a long oxyalkylene chain connected to an amino group, in which oxyalkylene groups from the class consisting of oxypropylene (e. g., 1,2-oxypropylene) and both oxyethylene and oxypropylene in a weight ratio of oxyethylene to oxypropylene not exceeding 4:1 in the same molecule form the major proportion of the average molecular weight of the treating composition, and the molecular weight attributable to oxyalkylene groups in said composition, and preferably in a single long oxyalkylene chain thereof, is at least 1000 where the oxyalkylene groups are both oxyethylene and oxypropylene, and at least 1200, preferably at least 2000 where the oxyalkylene groups are solely oxypropylene groups. The oxyalkylene groups preferably compose at least 60% of the average molecular weight of any given composition employed for the purpose of the invention and the best results have been obtained where the oxyalkylene groups in such composition consist of 80% to 100% by weight of oxypropylene groups. It has been discovered that the presence of these groups conveys to the composition unexpected and unusual properties for resolving water-in-oil emulsions into their component parts. One possible theory which may be postulated for the striking effectiveness of these compositions in resolving petroleum emulsions is that they have an unusual hydrophobe-hydrophile balance.

Other facts including the presence of the hydrophilic amino groups may well be responsible for the characteristics and effectiveness of this type of treating composition.

Where the treating compositions contain both oxyethylene and oxypropylene groups they can be prepared by adding a mixture of ethylene oxide and propylene oxide, e. g., 1,2-propylene oxide, to a primary or secondary amine. Alternatively, they can be prepared by adding the alkylene oxide to the primary or secondary amine successively, for example, 1,2-propylene oxide can be added to the primary or secondary amine followed by the addition of ethylene oxide.

The treating compositions employed for the purpose of the invention can also be classified on the basis of the solubility or insolubility of the initial amino reactant. Excellent results for the purpose of the invention are obtained by employing an addition product made by oxyalkylating in the manner described a water soluble primary or secondary amine. Good results in resolving some water-in-oil emulsions are obtained where the initial amino reactant is a water insoluble primary or secondary amine. In general, however, the more detailed description of the treating compositions employed for the purpose of the invention will be given with respect to the best mode contemplated for the practice of the invention, namely, by the use of addition products of the water soluble primary and secondary amines.

The preferred composition contemplated for use in accordance with the invention are exemplified by the following structural formula $$R'(OC_nH_{2n})_xR$$

where $R'$ is either hydrogen, an alkyl, alkenyl, aralkyl, aralkenyl, cycloalkyl, aryl or acyl radical; $R$ is secondary or tertiary aminoalkyl, secondary or tertiary aminoaralkyl, secondary or tertiary aminocycloalkyl, secondary or tertiary aminoaryl; $n$ is 3 or both 2 and 3 in a single molecule and $x$ is equal to the number of times $n$ is 3 or is the same as the number of times $n$ has a value of 2 plus the number of times $n$ has a value of 3 and the maximum ratio of $n$ having a value of 2 to $n$ having a value of 3 is such that the weight ratio of oxyethylene to oxypropylene does not exceed 4:1, it being further understood that the molecular weight of said composition attributable to oxyalkylene groups is at least 1000 when both the oxyethylene and oxypropylene groups are present in the same molecule and at least 1200, preferably at least 2000, when the oxyalkylene groups consist solely of oxypropylene groups.

All of the compounds employed for the purpose of the invention are characterized by the nucleus $$-(OC_nH_{2n})_x-$$

wherein $n$ has a value of 3 or both 2 and 3 in a weight ratio not exceeding 4:1 and a major proportion, preferably at least 60% by weight of the compound, is attributable to this nucleus. The total average molecular weight is preferably within the range of 1500 to 7500. However, depending upon the particular reactants the treating compositions suitable for the practice of the invention can have molecular weights up to 20,000 and higher.

As typical examples of compositions which are employed for the purpose of the invention there may be mentioned amine compositions having the foregoing structural formula in which R' is represented by hydrogen and R by secondary or tertiary aminoalkyl, secondary or teritary aminoaralkyl, secondary or tertiary aminocycloalkyl and secondary or tertiary aminoaryl, these terms having the specific definitions hereinafter given. It is to be understood that the substitution of hydrogen by halogen, nitro, hydroxyl, sulfonic and the like in the above structural formula does not depart from the scope of the invention for simple substitution products of this nature are equally within the contemplated scope of the invention.

It will be recognized that the treating compositions having the foregoing formula are monomeric except for the recurrence of the oxyalkylene groups. A polymeric substance may be described as one having recurring monomer units, these units being derived from the original starting materials. In a polymer all of such units recur at least twice. In a monomer, on the other hand, one of the starting materials may recur twice but not both of them. In the compositions described by the foregoing chemical formula, the products are both linear and monomeric in that the oxyalkylene chain occurs only once.

The oxyalkylene chain can be present twice in the same molecule and still have a monomer or the amino radical can be present twice and the oxyalkylene chain present once in the same molecule. Thus, the treating composition can have the formula $$R'(OC_nH_{2n})_xR(C_nH_{2n}O)_yR'$$

wherein the oxyalkylene radicals $-(OC_nH_{2n})-$ are connected respectively to the radical R' and to the same nitrogen atom or different nitrogen atoms of the radical R; $n$ has the previous significance and $x$ and $y$ have values such that the average molecular weight attributable to the oxyalkylene radicals is at least 1000 where the oxyalkylene radicals are both oxyethylene and oxypropylene and at least 1200 where the oxyalkylene radicals are solely oxypropylene.

In the last mentioned formula the oxyalkylene chain recurs twice but the initial amino unit only appears once. Thus, the composition is monomeric. It is recognized that the addition of an alkylene oxide to a primary or secondary amine especially a polyamine, can result in the formation of a mixture of addition products of varying molecular weights and can conceivably produce some addition products which are polymeric, particularly if polyamines are employed as initial reactants. The possibility of polymer formation depends somewhat upon the reaction conditions and also upon the reactants. Where the reaction is initially carried out by starting with a high molecular weight polyoxyalkylene compound containing a free hydroxyl group or groups and heating the amine therewith, the likelihood of polymer formation is not great unless the heating is carried out at temperatures of 150° C. to 300° C. for a long period of time, say 18 hours or longer. When the propylene oxide and/or ethylene oxide are simply added to the amine at temperatures below about 150° C. the alkylene oxides first react with the reactive hydrogen atoms of the amine and then add on to the resultant hydroxyl groups to form one or more long oxyalkylene chains. In this case, the resultant products can be mixtures of different addition products but such mixtures are predominantly monomeric, i. e., exclusive of the recurring oxyalkylene groups.

Where the initial reactants are an alkylene oxide and a monoamine, the resultant amino alcohols have different terminal groups connected to different carbon atoms, one of said terminal groups being a hydroxy group and the other being a substituted amino group. If the amine initially employed contains a terminal primary amino group the terminal amino group of the final product will be a secondary amino group. If the amine initially employed contains a terminal secondary amino group the terminal amino group of the final product will be a tertiary amino group.

Where the amine employed as one of the initial reactants is a polyamine the resultant compound contains amino groups linearly connected to polyoxyalkylene groups and the terminal groups are hydroxy groups. In other words, the amino groups are interiorly positioned in the structure of the compound and are not terminal groups.

Where monoamines are employed as the initial reactant useful compounds are obtained having molecular weights within the range of 1200 to 3000. Where polyamines are employed as the initial reactant, higher molecular weight compounds can be obtained. The molecular weight can be varied to some extent depending upon the molecular weight of the amine employed as the initial reactant, but will usually be determined largely by the number of amino groups present in the amine and the quantity of the alkylene oxide that can be reacted therewith.

Increasing the proportion of 1,2-propylene oxide employed in the reaction tends to increase the oil solubility of the resultant compound. However, many of the compounds employed for the purpose of the invention are water soluble. The effectiveness of the compounds in breaking water-in-oil emulsions appears to depend upon the hydrophile-hydrophobe balance produced by varying the proportions of ethylene oxide and 1,2-propylene oxide and by the presence of various types of substituted amino groups. Good results are obtained where the amine employed as an initial reactant is water soluble and the reaction product of the alkylene oxide and the amine are water insoluble. However, the initial reactant can be water soluble and the resultant end product can be water soluble.

It is preferable to employ for the purpose of the invention aliphatic amino alcohols characterized by a structure containing oxyethylene and oxy-1,2-propylene groups in the same molecule, having different terminal groups connected to different carbon atoms, one of said terminal groups being a hydroxy group and the other a substituted amino group and having a molecular weight of at least 1200, the oxyethylene and the oxypropylene groups being derived from a weight ratio of 1,2-propylene oxide to ethylene oxide within the range of 1:3 to 9:1, preferably about 1:1.

By way of illustrating the effectiveness of the products contemplated by this invention, the method of testing their efficiency in bottle tests will be described and exemplary data given.

*Example I*

Field bottle tests were made on samples of emulsified oil taken from the Stanolind Oil and Gas field at Hastings, Texas. A sample grind out showed that these emulsions contained about 50 parts of water per 100 parts of emulsion. A gun barrel system was being used in the field.

One hundred (100) cc. samples were taken and placed in conventional field test bottles. A finding ratio test indicated a treating ratio of 0.06 cc. of a 5% solution of the treating chemical was required per 100 cc. of sample.

Every effort was made to maintain conditions comparable to those present in a full scale plant treatment.

The test chemical was added to the samples in the test bottles and each bottle was agitated by shaking it 200 times at atmospheric temperatures. The compositions in the test bottles were then allowed to settle and were tested for water drop at predetermined periods of time. After cold agitation each sample was heated to a temperature of 140° F. and shaken an additional 100 times. After agitation at the elevated temperatures the samples were allowed to stand to permit settling and stratification of the water and were again tested for water drop.

The compositions hereinafter described as Ucon materials are products of Carbide and Carbon Chemicals Corporation. In these compositions the letter "H" signifies that the compositions are heteric in that they are made from both ethylene oxide and 1,2-propylene oxide. The letters "BA" indicate that the amine employed as an initial reactant is butylamine. The letters "DBA" indicate that the amine employed as an initial reactant is dibutylamine.

The composition identified as Ucon 50–HBA–607, which is the addition product with butylamine of ethylene oxide and 1,2-propylene oxide in a weight ratio of approximately 1:1 having a molecular weight of about 1269, caused 35 out of the 50 parts of water to separate before the bottles were given hot agitation and 40 parts out of the 50 parts of the water to separate after the hot agitation.

The period of time used in testing the samples after cold agitation was 15 minutes and after hot agitation was 30 minutes.

*Example II*

With the same procedure as described in Example I the composition identified as Ucon 50–HBA–1613, which is the addition product with butylamine of ethylene oxide and 1,2-propylene oxide in a weight ratio of approximately 1:1 having a molecular weight of approximately 2400, caused 40 out of the 50 parts of water to separate before the bottles were given hot agitation and 45 out of the 50 parts of water to separate after hot agitation.

*Example III*

With the same procedure as described in Example I the composition identified as Ucon 50–HBA–1776, which is the addition product with butylamine of ethylene oxide and 1,2-propylene oxide in a weight ratio of approximately 1:1 having a molecular weight of approximately 2300, caused 40 out of the 50 parts of water to separate before the bottles were given hot agitation and 45 out of the 50 parts of water to separate after hot agitation.

*Example IV*

With the same procedure as described in Example I the composition identified as Ucon 50–HBA–2098, which is the addition product with butylamine of ethylene oxide and 1,2-propylene oxide in a weight ratio of approximately 1:1 having a molecular weight of approximately 2400, caused 40 out of the 50 parts of water to separate before the bottles were given hot agitation and 45 out of the 50 parts of water to separate after hot agitation.

*Example V*

With the same procedure as described in Example I the composition identified as Ucon 50–HDBA–588, which is the addition product with dibutylamine of ethylene oxide and 1,2-propylene oxide in a weight ratio of approximately 1:1 having a molecular weight of approximately 1200, caused 37 out of the 50 parts of water to separate before the bottles were given hot agitation and 42 out of the 50 parts of water to separate after hot agitation.

*Example VI*

With the same procedure as described in Example I the composition identified as Ucon 50–HDBA–1373, which is the addition product with dibutylamine of ethylene oxide and 1,2-propylene oxide in a weight ratio of approximately 1:1 having a molecular weight of approximately 2200, caused 43 out of the 50 parts of water to separate before the bottles were given hot agitation and 48 out of the 50 parts of water to separate after hot agitation.

*Example VII*

With the same procedure as described in Example I the composition identified as Ucon 50–HDBA–2855, which is the addition product with dibutylamine of ethylene oxide and 1,2-propylene oxide in a weight ratio of approximately 1:1 having a molecular weight of approximately 2900, caused 40 out of the 50 parts of water to separate before the bottles were given hot agitation and 48 out of the 50 parts of water to separate after hot agitation.

*Example VIII*

The same compositions described in Examples I to VII were tested on a water-in-oil emulsion from a field at Thompsons, Texas and were found to be effective in resolving the emulsion into its components.

For the sake of completeness and in order that there will be no misunderstanding as to the composition of the products contemplated for use in the practice of the invention, the following examples are given to illustrate the preparation of some of these treating compositions.

*Example IX*

A mixture of equal parts of ethylene oxide and 1,2-propylene oxide was supplied to a reactor charged with 20 parts of n-butylamine and 0.8 part of dry powdered sodium hydroxide. The ethylene oxide had a water content of about 0.09% and an acetaldehyde content of about 0.06% and the 1,2-propylene oxide had a water content of about 0.05% and a propionaldehyde content of about 0.15%. The n-butylamine was substantially anhydrous. The pressure maintained during the introduction of the oxide mixture was about 5 to 22 p. s. i. (pounds per square inch gauge) over a period of about 2 hours and, thereafter, the mixture was cycled for a period of an additional hour. During the reaction the temperature was held at 90 to 100° C.

Following the same procedure additional amine diol compositions having an oxide ratio of 1:1 were produced by utilizing the product of one reaction as a starting material for compositions of higher viscosity and increased average molecular weight. The effectiveness for resolving water-in-oil petroleum emulsions appears to be related in part to the molecular weight of the compositions with the efficiency increasing as molecular weight increased. With these reactants, it is difficult if not impossible to prepare compositions having a molecular weight greater than 2500. In this molecular weight range the compositions are liquid and suitable for use as demulsifying agents.

The following products were prepared and possess properties and specifications as presented in the following table:

| Example | A | B | C | D |
| --- | --- | --- | --- | --- |
| Viscosity: | | | | |
| SUS at 100° F | 607 | 1,613 | 1,776 | 2,098 |
| SUS at 210° F | 103 | 259 | 289 | 335 |
| Average Molecular Weight, Menzies-Wright | 1,269 | 2,388 | 2,325 | 2,396 |
| Specific Gravity, 20/20° C | 1.0530 | 1.0573 | 1.0598 | 1.0645 |
| Flash Point, ° F | 468 | 460 | 440 | 485 |
| Fire Point, ° F | 564 | 585 | 515 | 560 |
| Water, Percent | 0.34 | 0.39 | 0.37 | 0.61 |
| pH of 5% Aqueous Solution | 10.7 | 9.98 | 10.0 | 8.86 |

Example X

A mixture containing equal parts of ethylene oxide and 1,2-propylene oxide was supplied to a reactor charged with 20 parts of di-n-butylamine and 0.8 part of dry powdered sodium hydroxide. The pressure maintained during the introduction of the oxide mixture was about 10 to 30 p. s. i. over a period of about 2 hours and, thereafter, the mixture was cycled for a period of about 1 hour. During the reaction the temperature was held at 90 to 115° C.

Following the same procedure additional amine oxyalkylol compositions having an ethylene oxide to 1,2-propylene oxide ratio of 1:1 were produced utilizing the product of one reaction as a starting material for compositions of higher viscosity and increased average molecular weight. Products were prepared having a molecular weight of approximately 3000 which are satisfactory for resolving water-in-oil petroleum emulsions.

The following products were prepared and possessed properties and specifications as presented in the following table.

| Example | A | B | C |
| --- | --- | --- | --- |
| Viscosity: | | | |
| SUS at 100° F | 588 | 1,373 | 2,855 |
| SUS at 210° F | 107 | 225 | 456 |
| Average Molecular Weight, Menzies-Wright | 1,220 | 2,170 | 2,860 |
| Specific Gravity, 20/20° C | 1.0411 | 1.0538 | 1.0568 |
| Flash Point, ° F | 386 | 415 | 437 |
| Fire Point, ° F | 495 | 515 | 510 |
| Water, Percent | 0.25 | 0.80 | 0.58 |
| pH of 5% aqueous solution | 11.0 | 10.8 | 10.6 |

Example XI

*Step I.*—Ninety-five (95) parts by weight of the mixture of equal amounts of ethylene oxide and propylene oxide were introduced into 20 parts by weight of butylamine containing 1 part of powdered sodium hydroxide dispersed therein. The temperature was maintained at about 105° C. and the oxide mixture was introduced into the butylamine at such a rate that the pressure was maintained at about 20 p. s. i. over a period of about 3 hours.

*Step II.*—To 30 parts by weight of the reaction product of Step I was added 0.5 part by weight of powdered sodium hydroxide, followed by 70 parts by weight of a mixture of equal parts of ethylene oxide and 1,2-propylene oxide. The temperature was maintained at 105° C. during the reaction and the oxide mixture supplied at such a rate as to maintain a pressure of about 18 p. s. i. The reaction product of this step was a heteric polyoxyalkylene amine composition having a molecular weight of approximately 1000.

The above examples cover compositions derived from monobutylamine and dibutylamine. Similarly, any other water soluble primary or secondary amine can be used as one of the initial reactants to yield products having valuable demulsifying characteristics. This reaction is only limited to those amine compositions having 1 or 2 replaceable hydrogen atoms attached directly to the nitrogen atom. Hence, primary and secondary amines of the aliphatic series are particularly suitable. Typical specific examples of suitable monoamines are amylamine, methylamine and dimethylamine, ethylamine and diethylamine, isopropylamine and diisopropylamine, butylamine and dibutylamine. Typical specific examples of suitable polyamines are ethylene diamine, propylene diamine, butylene diamine, trimethylene diamine, diethylene triamine, triethylenetetramine, tetraethylenepentamine, diisopropylenetriamine and triisopropylenetetramine.

The fact that compositions having valuable demulsifying characteristics can be obtained by oxyalkylating the water soluble primary or secondary amines is especially important for the practical application and use of the invention because these products are simpler to prepare than products where the initial material is water insoluble. Moreover, it could not be forseen that the products derived from the water soluble amines would have the necessary hydrophile-hydrophobe balance to be effective emulsion breakers.

Oxyalkylated high molecular weight water insoluble amines have heretofore been proposed for use in breaking acid-in-oil emulsions but in general the commercially available materials which are the most effective for breaking acid-in-oil emulsions are not commercially satisfactory or useful in breaking water-in-oil emulsions. In the practice of the present invention it has been found that while the addition products derived from the water insoluble amines are less desirable for use in breaking water-in-oil emulsions than those derived from the water soluble amines they are effective in breaking particular petroleum emulsions. Examples of slightly water soluble to water insoluble amines which can be employed in preparing such products for the purpose of the invention are the slightly soluble to water insoluble primary and secondary amines of the aliphatic series, cycloalkyl series, aryl series and aralkyl series. Specific examples of such amines are diamylamine, cyclohexylamine and dicyclohexylamine, aniline and diphenylamine, benzylamine and dibenzylamine, decylamine and didecylamine, dodecylamine and didodecylamine, octadecylamine and dioctadecylamine, alpha-naphthylamine and betanaphthylamine, decamethylenediamine, o-, m- and p-phenylene diamine, benzidine and naphthylenediamines.

It should be understood that the results will vary upon the emulsion being tested.

Throughout the specification and claims, the following definitions apply:

*Alkyl.*—A monovalent radical derived from an aliphatic hydrocarbon by removal of one hydrogen atom, as, for example, methyl, ethyl, propyl, octyl, cetyl, myricyl and their homologues, preferably containing 1 to 30 carbon atoms;

*Alkenyl.*—A monovalent radical derived from an unsaturated aliphatic hydrocarbon, as, for example, ethenyl (vinyl), allyl, undecenyl, octadecenyl, linolenyl, and their homologues, containing 2 to 18 carbon atoms and preferably having a single double bond;

*Aralkyl.*—A monovalent radical derived from an aromatic substituted aliphatic hydrocarbon, as, for example, benzyl, phenylethyl, phenylpropyl, phenylbutyl, phenyloctyl, phenylcetyl, phenyloctadecyl and homologues, preferably containing 1 to 30 carbon atoms in the alkyl chain;

*Cycloalkyl.*—A monovalent radical derived from a cycloaliphatic hydrocarbon radical, as, for example, cyclopentyl, cyclohexyl and cycloheptyl;

*Aralkenyl.*—A monovalent radical derived from an aromatic substituted unsaturated aliphatic hydrocarbon, as, for example, styryl, cinnamyl, and homologues;

*Aryl.*—A monovalent radical derived from an aromatic hydrocarbon by removal of one hydrogen atom, as, for example, phenyl and naphthyl;

*Acyl.*—A monovalent radical derived from an organic acid by the removal of the hydroxy group, as, for example, formyl, acetyl, propionyl, butyryl, octoyl, lauryoyl, stearoyl, trichloroacetyl, oleyl, ricinoleyl, benzoyl, phenylacetyl, naphthoyl, mono- and diphthaloyl, mono- and dimaleoyl, mono- and dimalonyl, mono- and di-adipoyl, mono- and diglutamoyl, mono- and disuccinoyl, toluene sulfonyl, naphthalene sulfonyl and acyl radicals derived from petroleum sulfonic acids;

*Secondary aminoalkyl.*—A monovalent radical derived by the removal of hydrogen from a nitrogen atom of a primary alkyl amine, as, for example, methylamino, ethylamino, butylamino, and higher homologues;

*Tertiary aminoalkyl.*—A monovalent radical derived by the removal of hydrogen from a nitrogen atom of a secondary alkyl amine, as, for example, dimethylamino, diethylamino, diisopropylamino, dibutylamino and higher homologues;

*Secondary amino cycloalkyl.*—A monovalent radical derived by the removal of hydrogen from a nitrogen atom of a primary cycloalkylamine, as, for example, cyclopentylamino and cyclohexylamino;

*Tertiary amino cycloalkyl.*—A monovalent radical derived by the removal of hydrogen from a nitrogen atom of a secondary cycloalkylamine, as, for example, dicyclopentylamino and dicyclohexylamino;

*Secondary amino aralkyl.*—A monovalent radical derived by the removal of hydrogen from a nitrogen atom of a primary aralkyl amine as, for example, benzylamine;

*Tertiary amino aralkyl.*—A monovalent radical derived by the removal of hydrogen from a nitrogen atom of a secondary aralkyl amine, as, for example, dibenzylamine;

*Secondary aminoaryl.*—A monovalent radical derived by the removal of hydrogen from a nitrogen atom of a primary arylamine, as, for example, aniline, alpha-naphthylamine and beta-naphthylamine;

*Tertiary aminoaryl.*—A monovalent radical derived by the removal of hydrogen from a nitrogen atom of a secondary arylamine, as, for example, diphenylamine.

The demulsifying compositions of the present invention are preferably employed in the proportions of one part of demulsifying agent to from 10,000 to 100,000 parts of emulsion either by adding the concentrated product directly to the emulsion or after diluting with a suitable vehicle in the customary manner.

Among the suitable hydrocarbon vehicles which can be employed as diluents is sulfur dioxide ($SO_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, Bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and are suitable for use in breaking water-in-oil petroleum emulsions in the Mid-Continent oil fields, including Oklahoma, Illinois, Kansas, the Gulf Coast, Louisiana, Southwest Texas and California.

This application is a continuation-in-part of my copending applications Serial Nos. 98,162, filed June 9, 1949, and 248,883, filed September 28, 1951, both now abandoned.

The invention is hereby claimed as follows:

1. A process of resolving water-in-oil emulsions into their components which comprises treating such emulsions with a composition of high molecular weight having a long oxyalkylene chain connected to an amino group of a water soluble monoamine in which oxyalkylene groups from the class consisting of oxypropylene and both oxyethylene and oxypropylene in a weight ratio of oxyethylene to oxypropylene not exceeding 4:1 in the same molecule form the major proportion of the average molecular weight of said composition, and the average molecular weight attributable to said oxyalkylene groups is at least 1000 where the oxyalkylene groups are both oxyethylene and oxypropylene and at least 1200 where the oxyalkylene groups are solely oxypropylene groups.

2. A process of resolving water-in-oil emulsions into their components which comprises treating such emulsions with a composition of high molecular weight having a long oxyalkylene chain connected to an amino group of a water soluble monoamine in which both oxyethylene and oxypropylene in a weight ratio of oxyethylene to oxypropylene not exceeding 4:1 in the same molecule form the major proportion of the average molecular weight of said composition, and the average molecular weight attributable to said oxyalkylene groups is at least 1000.

3. A process of resolving water-in-oil emulsions into their components which comprises treating such emulsions with a treating composition having the following general chemical formula $$[H(OC_nH_{2n})_x]_yR$$

where R is an amino radical of a water soluble monoamine connected through a nitrogen atom thereof to a terminal carbon atom of the radical $H(OC_nH_{2n})_x$— , n is a number from the group 3 and both 2 and 3, x equals the number of times n has a value of 2 plus the number of times n has a value of 3, the maximum ratio of n having a value of 2 to n having a value of 3 is such that the weight ratio of oxypropylene to oxyethylene is within the range of 1:3 to 9:1, and y is an integer not greater than 2, with the further proviso that the molecular weight attributable to the radical $$H(OC_nH_{2n})_x-$$

is at least 1000, said radical composes at least 60% of the average molecular weight of the composition, and the average molecular weight of the composition does not exceed 20,000.

4. A process of resolving water-in-oil emulsions into their components which comprises treating such emulsions with a composition of high molecular weight having a long oxyalkylene chain connected to an amino group of a water soluble monoamine in which both oxyethylene and oxypropylene groups in a weight ratio of oxypropylene to oxyethylene within the range of 1:3 to 9:1 compose at least 60% of the average molecular weight of said composition, and the average molecular weight of said composition is within the range from 1500 to 7500.

5. A process of resolving water-in-oil emulsions into their components which comprises treating such emulsions with a composition of high molecular weight having a long oxyalkylene chain connected to an amino group of a water soluble monoamine in which both oxyethylene and oxypropylene groups in a weight ratio of oxypropylene to oxyethylene within the range from 1:3 to 9:1 compose at least 60% of the average molecular weight of said composition and the average molecular weight of said composition is within the range from 1500 to 7500, said composition being an oxyalkylated water soluble primary alkylamine.

6. A process of resolving water-in-oil emulsions into their components which comprises treating such emulsions with a composition of high molecular weight having a long oxyalkylene chain connected to an amino group of a water soluble monoamine in which both oxyethylene and oxypropylene groups in a weight ratio of oxypropylene to oxyethylene within the range from 1:3 to 9:1 compose at least 60% of the average molecular weight of said composition and the average molecular weight of said composition is within the range from 1500 to 7500, said composition being an oxyalkylated water soluble primary alkylamine in which a single long oxyalkylene chain thereof has a molecular weight of at least 1000.

7. A process of resolving water-in-oil emulsions into their components which comprises treating such emulsions with a composition of high molecular weight having a long oxyalkylene chain connected to an amino group of a water soluble monoamine in which both oxyethylene and oxypropylene groups in a weight ratio of oxypropylene to oxyethylene within the range from 1:3 to 9:1 compose at least 60% of the average molecular weight of said composition and the average molecular weight of said composition is within the range from 1500 to 7500, said composition being an oxylated water soluble secondary alkylamine.

8. A process of resolving water-in-oil emulsions into their components which comprises treating such emulsions with a composition of high molecular weight having a long oxyalkylene chain connected to an amino group of a water soluble monoamine in which both oxyethylene and oxypropylene groups in a weight ratio of oxypropylene to oxyethylene within the range from 1:3 to 9:1 compose at least 60% of the average molecular weight of said composition and the average molecular weight of said composition is within the range from 1500 to 7500, said composition being an oxyalkylated water soluble secondary alkylamine in which a single long oxyalkylene chain thereof has a molecular weight of at least 1000.

9. A process of resolving water-in-oil emulsions into their components which comprises treating such emulsions with a composition of high molecular weight having a long oxyalkylene chain connected to an amino group of a water soluble monoamine in which both oxyethylene and oxypropylene groups in a weight ratio of oxypropylene to oxyethylene within the range from 1:3 to 9:1 compose at least 60% of the average molecular weight of said composition and the average molecular weight of said composition is within the range from 1500 to 7500, said composition being an addition product of ethylene oxide and 1,2-propylene oxide to butylamine.

10. A process of resolving water-in-oil emulsions into their components which comprises treating such emulsions with a composition of high molecular weight having a long oxyalkylene chain connected to an amino group of a water soluble monoamine in which both oxyethylene and oxypropylene groups in a weight ratio of oxypropylene to oxyethylene within the range from 1:3 to 9:1 compose at least 60% of the average molecular weight of said composition and the average molecular weight of said composition is within the range from 1500 to 7500, said composition being an addition product of ethylene oxide and 1,2-propylene oxide to dibutylamine.

References Cited in the file of this patent

UNITED STATES PATENTS

| | | |
|---|---|---|
| 2,233,383 | De Groote et al. | Feb. 25, 1941 |
| 2,552,530 | De Groote | May 15, 1951 |
| 2,552,531 | De Groote | May 15, 1951 |
| 2,552,534 | De Groote | May 15, 1951 |